United States Patent [19]

Garoutte et al.

[11] 4,358,514
[45] Nov. 9, 1982

[54] HEADER DEVICE FOR ELECTROCHEMICAL CELLS

[75] Inventors: Kurt F. Garoutte, Furlong; Curtis J. Michener, Harleysville, both of Pa.

[73] Assignee: Honeywell Inc., Minneapolis, Minn.

[21] Appl. No.: 248,093

[22] Filed: Mar. 27, 1981

[51] Int. Cl.³ .................... H01M 2/08; H01M 2/32
[52] U.S. Cl. ................... 429/181; 174/50.61; 174/152 GM
[58] Field of Search ............ 429/178, 181, 174, 185; 174/50.61, 152 GM

[56] References Cited

U.S. PATENT DOCUMENTS

| | | | |
|---|---|---|---|
| 3,418,423 | 12/1968 | Bronnes et al. | 174/152 GM |
| 4,011,371 | 3/1977 | Hallett et al. | 429/185 |
| 4,127,702 | 11/1978 | Catanzarite | 429/181 |
| 4,233,372 | 11/1980 | Bro et al. | 429/181 |

*Primary Examiner*—Donald L. Walton
*Attorney, Agent, or Firm*—Charles G. Mersereau

[57] ABSTRACT

A header device for use with an electrochemical cell requiring a hermetic seal between the header, the terminal pin, and the body of the cell. A stainless steel header is sized to fit the cell body and hermetically sealed to the body. An annular glass ring is bonded to the header. Centered in and bonded to the ring is a terminal pin consisting of a solid central core of material selected from nickel and nickel alloys and a stainless steel sleeve surrounding the core. The thickness of the sleeve is less than 0.01 inches. The annular glass ring electrically insulates the stainless steel header from the terminal pin. The sleeve is bonded to the core by a nickel braze. The bonding of the pin to the ring and the ring to the header is accomplished at an elevated temperature of at least 1800 degrees Fahrenheit.

4 Claims, 2 Drawing Figures

HEADER DEVICE FOR ELECTROCHEMICAL CELLS

BACKGROUND OF THE INVENTION

Electrochemical cells and particularly the lithium batteries contain highly reactive components. Packaging these materials properly is critical, since corrosion can readily destroy the most efficient battery through by-products and leakage. For that reason, stainless steel has become one of the most preferred packing materials for lithium batteries.

However, one other requirement in these high energy batteries is that the cells be hermetically sealed to prevent outside contamination of the cells and prevent leakage which can result in loss of performance and/or damage to the environment. Accordingly, efforts have been made to hermetically seal the battery, using stainless steel as mentioned above and glass which has been found to be an impervious insulator suitable for sealing the battery and preventing shorting of the cell between the anode and cathode.

Because of the differences in coefficient of expansion of stainless steel and glass and the relatively high temperatures required to fabricate glass to metal seals, glass to metal seals with a stainless steel pin have heretofore not been successfully fabricated. Normally, such seals between glass and metal require elevated fabrication temperatures of at least 1800° Fahrenheit and preferable 2000° Fahrenheit.

SUMMARY OF THE INVENTION

It has now been discovered that a new and improved useful header device for use with electrochemical cells requiring a hermetic seal can be manufactured according to the present invention. The header device permits a hermetic seal between the header, the terminal pin and the body of the cell. The device comprises a stainless steel header sized to hermetically fit the body and a glass annular ring bonded to the header. A terminal pin is bonded to the ring with the pin comprising a solid central core of a material selected from nickel and nickel alloys and further has a stainless steel sleeve on the core, the sleeve having a thickness of less than 0.01 inches. A nickel braze is employed to bond the sleeve to the core.

In a preferred embodiment, the sleeve covered core is bonded to the ring at a temperature of at least 1800° Fahrenheit. In a preferred embodiment, the sleeve may range in thickness from about 0.001 inches to about 0.005 inches. To insure complete contact of cell with the terminal pin, the sleeve and core may be extended axially into the cell.

BRIEF DESCRIPTION OF THE DRAWING

For a more complete understanding of the invention, reference is hereby made to the drawings, in which.

DESCRIPTION OF THE PREFERRED EMBODIMENT

Figure 1:
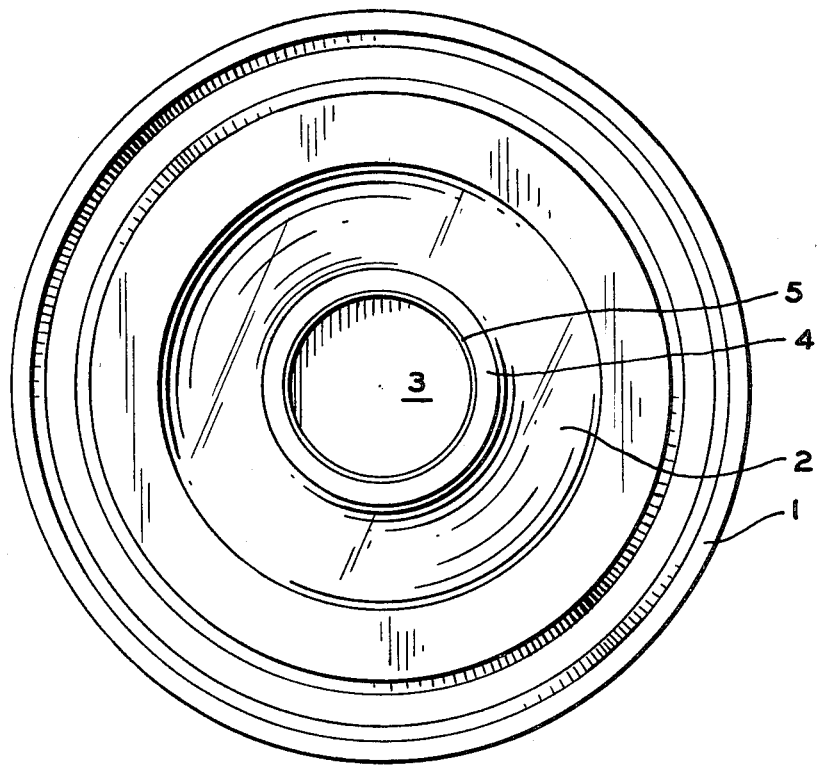
FIG. 1 is a schematic top view showing the preferred embodiment of the present invention.
Figure 2:
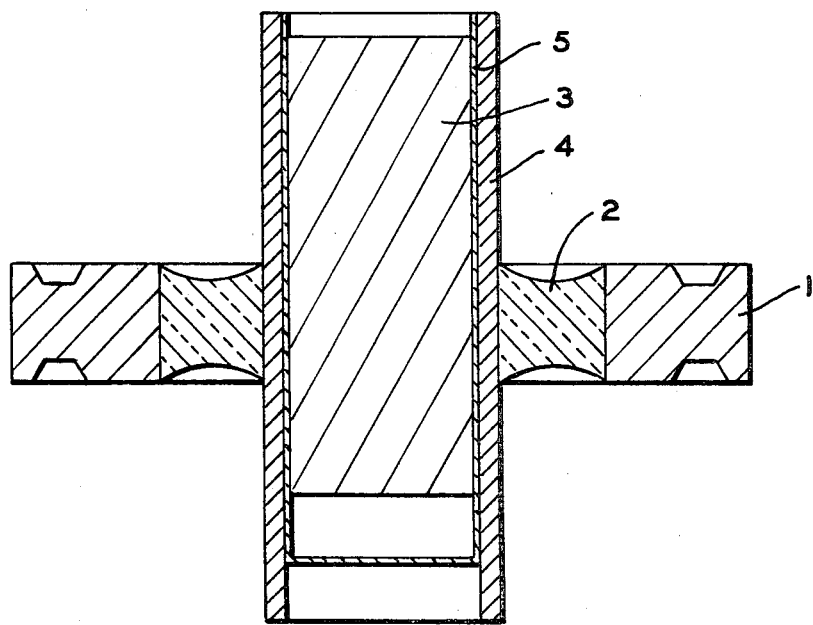
FIG. 2 is a schematic view in section of the device shown in FIG. 1.

The header device of the present invention is shown generally in the figures. The header device is admirally suited for forming a hermetic seal between the header, the terminal pin and the body of an electrical chemical cell, and particularly those cells with highly corrosive materials such as lithium-sulfur dioxide and lithium-thionyl chloride batteries. The stainless steel header 1 is sized to hermetically fit the body of a cell, whereby welding or other hermetically bonding can be accomplished in a conventional manner. Fitted inside the stainless steel header 1 is an annular glass ring 2 which is bonded to the stainless steel header. Fitted within the annular glass ring 2 is a terminal pin which consists of a central nickel core 3, and a stainless steel sleeve 4. High temperature nickel brazing 5 is applied to keep the thin outer shell 4 solidly bonded to the nickel core 3 under the high temperatures of fabrication, which may range from at least 1800° F. to in excess of 2000° F. The brazing 5 further prevents circumferential growth of the sleeve 4. The nickel braze 5 also provides a low resistance of electrical contact through the seal terminal pin. By making the sleeve 4 slightly longer than the nickel core 3, subsequent trimming of the sleeve and welding of the enclosures into the inside diameter of the sleeve can be accomplished. The glass 2 and the nickel core 3 have relatively closely matched coefficients of expansion, particularly when compared to the coefficient of expansion of the stainless steel.

Having thus described the invention, what is claimed is:

1. A hermetic sealing device for providing a hermetic seal between the header, terminal pin and body of an electrochemical cell, comprising:
    a stainless steel header sized to hermetically fit the body and having an annualar opening therein;
    an annular glass ring disposed in the annular opening in said header and bonded thereto;
    a terminal pin disposed in the annular opening in said glass ring and bonded to said ring, said pin further comprising,
        a solid central core of a material selected from nickel and nickel alloys having a thermal coefficient of expansion compatible with the thermal coefficient of expansion of said glass ring,
        a stainless steel sleeve surrounding said core and bonded to said glass ring, said sleeve having a thickness of less than 0.01 inches, and
        a nickel braze bonding said sleeve to said core.
2. The device of claim 1 wherein said thermal pin is bonded to said ring at a temperature of at least 1800° F.
3. The device of claim 1 wherein said sleeve is between 0.001 inches and 0.005 inches in thickness.
4. The device of claim 1 wherein said sleeve and core extend partially into said cell.

* * * * *